United States Patent [19]

Lipinski et al.

[11] Patent Number: 4,913,823

[45] Date of Patent: Apr. 3, 1990

[54] PROCESS FOR DISSOLVING AND REMOVING SCALE FROM AQUEOUS SYSTEMS

[75] Inventors: Richard J. Lipinski, Aurora; Kelvin Y. Chang, Solon, both of Ohio

[73] Assignee: The Mogul Corporation, Chagrin Falls, Ohio

[21] Appl. No.: 258,034

[22] Filed: Oct. 14, 1988

[51] Int. Cl.⁴ ............................................. C02F 5/14
[52] U.S. Cl. ........................................ 210/699; 134/3; 134/22.19; 134/41; 210/698; 252/82; 252/180
[58] Field of Search ................... 134/3, 22.19, 41; 210/698–701; 252/82, 87, 180, 181

[56] References Cited

U.S. PATENT DOCUMENTS

| | | | |
|---|---|---|---|
| 3,996,062 | 12/1976 | Frost et al. | 134/3 |
| 4,046,707 | 9/1977 | Smith et al. | 210/699 |
| 4,372,870 | 2/1983 | Snyder et al. | 210/701 |
| 4,457,847 | 7/1984 | Lorenc et al. | 210/701 |
| 4,497,713 | 2/1985 | Geiger | 210/699 |
| 4,563,284 | 1/1986 | Amjad | 252/180 |
| 4,681,686 | 7/1987 | Richardson | 210/699 |
| 4,802,990 | 2/1989 | Inskeer | 134/3 |
| 4,806,259 | 2/1989 | Amjad | 210/699 |

Primary Examiner—Peter Hruskoci
Attorney, Agent, or Firm—Pearne, Gordon, McCoy & Granger

[57] ABSTRACT

This invention relates to a process of dissolving and removing silicate scale and particularly magnesium silicate scale and sludge from various aqueous systems, particularly boiler water and desalination systems by adding to the water effective amounts of at least one water-soluble phosphinocarboxylic acid. These polyphosphinocarboxylic acids and the salts thereof are added to the water in the aqueous system in amounts ranging up to about 50 thousand parts by weight per million and preferably in amounts ranging up to about 2000 parts by weight per million parts by weight of water either alone or in combination with at least one organic dispersant selected from the group consisting of nonionic and anionic dispersants.

10 Claims, 9 Drawing Sheets

PROCESS FOR DISSOLVING AND REMOVING SCALE FROM AQUEOUS SYSTEMS

BACKGROUND OF THE INVENTION

This invention relates to a process for using a phosphinocarboxylic acid and the salts thereof to dissolve and remove accumulation of silicate metal scale in aqueous systems. More specifically, this invention provides a method wherein certain phosphinocarboxylic acids and the metal salts thereof effectively dissolve and prevent the formation of silicate scale and sludge deposits in various aqueous systems.

It is generally known that the formation of scale and sludge deposits e.g. magnesium silicate scale on heating surfaces is one of the most serious problems encountered in aqueous systems such as in boiler operations, cooling towers, heat exchangers and the like. To prevent the formation of silicate scale, particularly magnesium silicate scale, from accumulating in these water systems, various treatments of the water generally requires the use of a combination of precipitating or dispersing agents, sludge conditioners and the like to keep the sludge in the systems fluid to be effectively removed. Aqueous systems which operate at high temperatures such as boilers, heat exchangers and the like are notoriously susceptible to the buildup of scale due to the impurities in the water e.g. calcium salts, iron oxides and particularly, magnesium salts such as magnesium silicates. The buildup of scale on the heat transfer surfaces is a serious problem primarily because the rate of heat transfer through the surfaces contributes to an overall loss of efficiency and therefore increased energy costs. Moreover, heat transfer surfaces with scale and sludge coatings are susceptible to corrosion beneath the scale since corrosion control agents are unable to effectively protect the metal surfaces.

Experience has proven that the use of various sophisticated water pre-treatment compositions do not always avoid the buildup of scale, particularly magnesium silicate scale in the water systems. Presently, scale prevention compositions include chelants, polymeric dispersants and conditioners or sequestering agents. Chelants, for example, e.g. sodium salt of ethylenediaminetetraacetic acid (EDTA) or the sodium salt of nitrilotriacetate (NTA) stoichiometrically are used to sequester metal ions such as calcium, magnesium, iron, etc. The removal of magnesium scale or sludge e.g. magnesium silicate is generally accomplished by descaling the systems with acid treatments. Acid treatments generally include the use of various organic acids such as citric or sulfamic or one of the mineral acids such as hydrochloric. However, it is obvious that in acid descaling, the system must be shutdown, drained, acid cleaned, rinsed, drained and then re-treated. Acid scaling therefore results in loss of time due to the shutdown which requires interrupting production schedules in order to achieve cleaning. Accordingly, a purpose of this invention is to provide a method of descaling by using comparatively large amounts of a phosphinocarboxylic acid or the salt thereof while the system is in continuous operation, therefore not requiring any shutdown or draining. It was found that effective amounts of the phosphinocarboxylic acids and its salts either alone or with other known dispersing agents, chelants and the like, are capable of dissolving silicate scale and sludge, particularly magnesium silicate scale that builds up in a water system and can be removed in a continuous process without interrupting the operation of the system.

Presently, various water-soluble polyelectrolytes and polymeric compositions are being used for controlling scale. The mechanism is primarily by prohibiting the formation of scale deposition by crystal modification and dispersion. Originally, the acrylic and maleic acid compounds, for example, were effectively used against calcium carbonate, the sulphates, etc. More recently, a number of high performance copolymers and terpolymers were developed which are also capable of controlling the buildup of multiple scalants including the magnesium and calcium silicates, phosphates, etc. Presently, however, there is no method available wherein any of these polyelectrolytes and/or polymeric compositions can be used to dissolve magnesium silicate scale once it has formed in the system.

For example, heretofore a process of inhibiting magnesium scale formation in an evaporation system, i.e. the processing of saline water, required the use of various polymeric materials such as a polyanionic compound derived from unsaturated diabasic acid and unsaturated sulphonic acid in combination with polycationic polymers. Desalination is an evaporation process wherein the units are operated under a vacuum either at atmospheric pressure or higher. In operating these desalination units, the temperature depends on the operating pressures which influences the nature of the scale that forms in the system. While scale formation caused by calcium carbonate can be controlled, for example, by the use of various additives, the problem of magnesium silicate scale or sludge control in evaporation systems has not been satisfactory. The rapid formation of magnesium silicate scale or sludge substantially reduces the efficiency of the system requiring a shutdown to remove the scale from the units. The loss of the operating time and the difficulty in removing the scale adds to the total cost of the operation.

In view of these problems, different methods have been proposed using certain chelating agents such as the polyphosphates as shown in U.S. Pat. No. 2,782,162. In addition, polyelectrolytes such as the sodium polyacrylates were found to be effective to prevent calcium carbonate scale at high temperatures. U.S. Pat. No. 3,981,779 teaches the use of various chelants and surfactants, e.g. aminodiacetic acids and their salts to decrease the buildup of magnesium hydroxide scale to a limited degree. Further, U.S. Pat. No. 3,985,671 teaches the use of alkylene phosphates and quaternary ammonium chloride compounds as scale control agents for recircling water in cooling systems. Thus, while a number of chelants and polymeric compounds have been used to inhibit the formation of scale in the operation of evaporation and heat transfer systems, etc. none of these compositions were found to be effective in dissolving and removing magnesium scale, i.e. magnesium silicates from these systems.

SUMMARY OF THE INVENTION

It is a purpose of this invention to provide a process for treating aqueous systems with an effective amount of a phosphinocarboxylic acid or its salt which is capable of dissolving and removing silicate scale without disrupting the system e.g. an evaporation process for the desalination of water. The process of this invention comprises the use of effective amounts, e.g. 300 to 2000 parts by weight per million parts by weight of the water passing through this system of at least one water-soluble phosphinocarboxylic acid or a salt thereof. The salts of the phosphinocarboxylic acid preferably include the alkali and alkaline metal salts wherein one or more of the carboxylic acid groups of the phosphinocarboxylic acid are neutralized with a metal compound forming a complete salt of the acid or in some instances a partial salt of said acid. The molecular weight of the phosphinocarboxylic acids useful for purposes of this invention may range from as low as about 300 to about 12,000 and may be used alone or in combination with other known water treating chemicals and particularly dispersants including the nonionic and anionic dispersants and/or surfactants.

DESCRIPTION OF THE PREFERRED EMBODIMENTS

Figure 1:
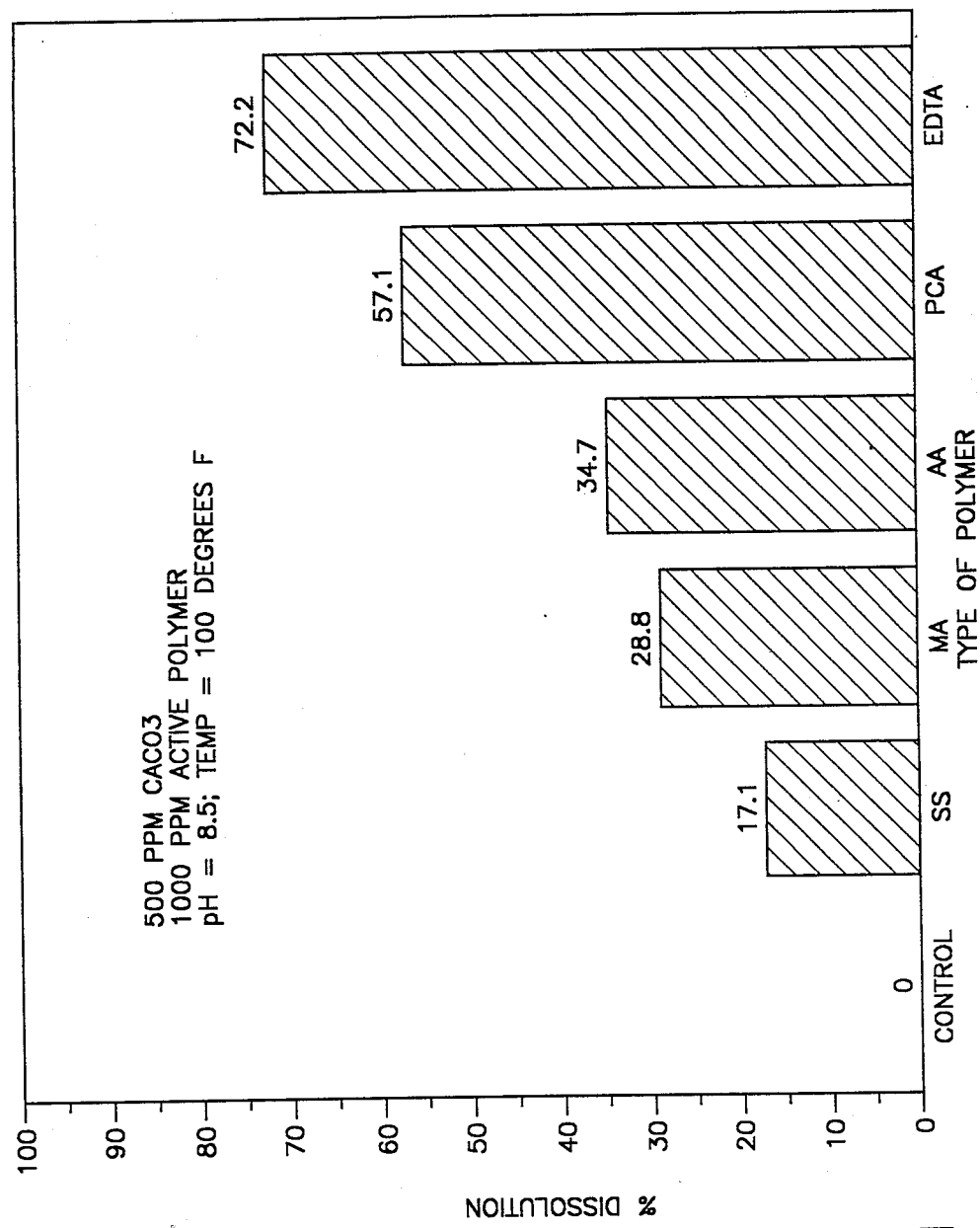
FIGS. 1, 2 and 3 are graphs showing the results of calcium carbonate dissolution tests comparing various compounds and polymers with phosphinocarboxylic acid in accordance with the present invention.

In accordance with this invention, it was found that by adding comparatively large amounts of a phosphinocarboxylic acid or the salt thereof, to an aqueous system, that silicate scale and sludge e.g. magnesium silicate scale built up on the surfaces of said system can be readily dissolved and removed from said systems. The phosphinocarboxylic acid and its salts are added to the water in comparatively large amounts ranging up to about 50,000 parts by weight per million parts by weight of the water. The water-soluble phosphinocarboxylic acid have the formula:

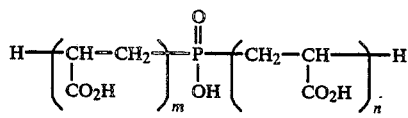
I.

wherein the sum of m+n is an integer having a value ranging from about 3 to 100. One or more of the carboxylic acids groups of the phosphinocarboxylic acid may be neutralized with one or more metal compounds wherein the metal is preferably selected from the group consisting of the alkali and alkaline earth metals. The phosphinocarboxylic acid may be partially or completely neutralized with one or more metal compounds and used alone or in combination with other known organic dispersants and particularly dispersants and/or surfactants selected from the group consisting of nonionic and anionic dispersants.

For purposes of this invention, the term aqueous systems to which the water-soluble phosphinocarboxylic acids are added include all water systems such as cooling water systems, boiler water systems, air conditioning systems, steam generating systems, sea water evaporating systems, hydrostatic cookers, closed circuit heating or refrigerant systems, and the like.

While it is essential for purposes of dissolving scale and sludge, e.g. magnesium silicates, to use the water-soluble phosphinocarboxylic acids in amounts ranging up to about 50,000 parts by weight. The preferred amount for purposes of this invention ranges from about 500 to 2000 or 800 to 1500 parts by weight of the phosphinocarboxylic acid per million parts by weight of water passing through the aqueous systems. The water-soluble phosphinocarboxylic acids and the salts thereof useful for purposes of this invention may be prepared by the methods shown in the following examples.

EXAMPLE 1

Reaction of acrylic acid and sodium hypophosphite in a 2:1 molar ratio.

To a solution of 44 g (0.5 mole) sodium hypophosphite in 100 g water at 75° C. was added a solution of 14.4 g sodium persulphate in 100 g of water dropwise over a period of 2.5 hours. 5 minutes after the start of this addition the addition of 72 g (1 mole) acrylic acid was commenced, the acrylic acid being added over a period of 2 hours. On the completion of the additions, the reaction mixture was heated to 85° C. and maintained for a period of 2 hours.

A sample of the telomer was isolated by evaporating 100 g. of the solution to dryness. The residue was treated with 200 mls. hot methanol. The solution was filtered to remove unreacted sodium hypophosphite and sodium persulphate decomposition products. The filtrate was concentrated to a volume of 100 mls and the telomer precipitated by the addition of 1 liter diethyl ether. A telomer was obtained, after drying under vacuum at 50° C., which had a phosphorus content of 12.7% and molecular weight of 440, determined by osmometry in water.

EXAMPLE 2

Reaction of acrylic acid and sodium hypophosphite in a 8:1 molar ratio.

A telomer was prepared by the method described above in Example 1, except that 288 g (4.0 moles) acrylic acid were used instead of 72 g. and the amount of sodium persulphate was increased to 28.8 g. from 14.4 g. The telomer had a phosphorus content of 4.9% and molecular weight of 750, determined by osmometry in water.

EXAMPLE 3

Reaction of acrylic acid and sodium hypophosphite in a 16:1 molar ratio

A telomer was prepared by the method described above in Example 1 except that 576 g (8.0 moles) acrylic acid were used instead of 72 g. and the amount of sodium persulphate was increased to 56.4 g. from 14.4 g. The telomer had a phosphorus content of 2.0% and molecular weight of 1,130, determined by osmometry in water.

The phosphinocarboxylic acids and the salts thereof are known compositions and may be prepared in accordance with the process set forth in U.S. Pat. No. 2,957,931, the disclosure of which is incorporated herein by reference. More specifically, the phosphinocarboxylic acids may be prepared by reacting various molar ratios of an unsaturated acid such as acrylic acid having the formula:

with an acid having the formula:

As indicated, the salts of the acid may be prepared whereby the acidic hydrogens are partially or completely replaced with a cation preferably derived from the alkali or alkaline earth metals.

While various phosphorus compounds and polymeric dispersants have been used to avoid many of the problems caused by calcium and iron scale on heat transfer surfaces, under more extreme operating conditions e.g. desalination units, there are more serious problems which develop due to the formation of magnesium scale, e.g. magnesium silicate. Magnesium silicate scale, for example, is formed at relatively high pH conditions from magnesium hydroxide which is inversely soluble with respect to temperature and precipitates near the heated surface where the temperatures are much higher than the rest of the water. Magnesium hydroxide has the ability to absorb colloidal silica from the water to form deposits which have the composition 2MGO-2SIO-2H2O. Once this material forms on the surface of the heated surface, it is difficult to remove and in the past various acids have been used such as the mineral acids to clean the system. In accordance with this invention, it was found that comparatively large amounts of a phosphinocarboxylic acid and/or its salt added to the water passing through the systems will dissolve the buildup of magnesium silicate and thereby provide a means of removing the scale from the system.

While various compounds and polymeric materials have been used to prevent scale from accumulating in aqueous systems, none of these materials have proven to be as satisfactory as the phosphinocarboxylic acids to remove silicate scale as shown by the data in FIGS. 1-9.

More specifically, the following compounds and/or polymers identified in Table I were compared with the phosphinocarboxylic acids of this invention as shown by the data in FIGS. 1-9 and in Table II.

TABLE I

| | TRADE NAME | COMPOUNDS |
|---|---|---|
| 1. | Goodrite kxp-82 | AA |
| 2. | Belclene 200 | MA |
| 3. | Belsperse 161 | PCA |
| 4. | Versa TL-502 | SS |
| 5. | Aquatreat X-206-M5 | AA/MeAA (1:2) |
| 6. | Cyanamer P-70 | AA/AAm |
| 7. | Alkasperse Ap-25 | AA/HPA |
| 8. | AquatreatX-310-M9 | AA/VSA (9:1) |
| 9. | Acrysol QR-1086 | AA/AMPS |
| 10. | Versa TL-4 | SS/MA (3:1) |
| 11. | Monsanto EMA-03 | E/MA |
| 12. | Belclene 400 | AA/AMPS/PCA (16:2:1) |
| 13. | Acrysol WTP-1 | AA/AMPS/VA |
| 14. | Belclene 283 | MA/VA/EA (9:1:1) |
| 16. | Goodrite K-796 | AA/AAm/MeAA/EEEA |
| 16. | EDTA Na4 | Sodium salt of ethylene diamine tetra acetic acid |

Legend:
| 1. | AA | Acrylic Acid |
|---|---|---|
| 2. | MA | Maleic Anhydride |
| 3. | PCA | Phosphinocarboxylic Acid |
| 4. | SS | Sulfonated Styrene |
| 5. | AA/MeAA (1:2) | Acrylic Acid/Methacrylio Acid |
| 6. | AA/AAm | Acrylic Acid/Acrylamide |
| 7. | AA/HpA | Acrylic Acid/2-Hydroxypropylacrylic Acid |

TABLE I-continued

| | | |
|---|---|---|
| 8. | AA/VSA (9:1) | Acrylic Acid/Vinyl Sulfonic Acid |
| 9. | AA/AMPS | Acrylic Acid/2-Acrylamido-2-Methylpropanesulfonic Acid |
| 10. | SS/MA (3:1) | Sulfonated Styrene/Maleic Anhydride |
| 11. | E/MA | Ethylene/Maleic Anhydride |
| 12. | AA/AMPS/PCA (16:2:1) | Acrylic Acid/2-Acrylamido-2-Methylpropanesulfonic Acid/Phosphino Carboxylic Acid |
| 13. | AA/AMPS/VA | Acrylic Acid/2-Acrylamido-2-Methylpropanesuifonic Acid/Vinyl Acetate |
| 14. | MA/VA/EA (9:1:1) | Maleic Anhydride/Vinyl Acetate/Ethyl Acrylate |
| 15. | AA/AAm/MeAA/EEEA | Acrylic Acid/Acrylamide/Methacrylic Acid/2-(2-Ethoxyethoxy) Ethyl Acrylate |
| 16. | EDTA Na4 | Sodium salt of ethylenediamine tetra acetic acid |

TABLE II

| | PERCENT DISSOLUTION | | |
|---|---|---|---|
| Example No. | CaCO3 | Ca10(OH)2(Po4)6 | MgSiO3 |
| 1 | 34.7 | 56.2 | 0 |
| 2 | 28.8 | 7.3 | 17.8 |
| 3 | 57.1 | 76.1 | 80.0 |
| 4 | 17.1 | 5.2 | 0 |
| 5 | 45.3 | 30.8 | 7 |
| 6 | 33.5 | 80.1 | 0 |
| 7 | 26.1 | 20.1 | 27.9 |
| 8 | 47.8 | 28.1 | 20.9 |
| 9 | 45.3 | 57.4 | 10.9 |
| 10 | 27.4 | 12.5 | 12.9 |
| 11 | 32.8 | 22.8 | 11.6 |
| 12 | 51.6 | 65.6 | 18.8 |
| 13 | 41.1 | 53.3 | 35.6 |
| 14 | 36.0 | 19.2 | 18.8 |
| 15 | 43.2 | 61.4 | 50.5 |
| 16 | 72.2 | 98.5 | 52.5 |

The data was obtained in laboratory screening tests conducted in approximately 200 milliliters of deionized water at pH 8.5 and a temperature of 100°±2° F. Each of the test scalants were added at test levels of 500 PPM for CaCo3 and 100 PPM for both Ca10 (OH)2(Po4)6 and MgSiO3. Active test levels used for test polyelectrolytes were 1000 ppm. for the CaCo3 scalant and 500 ppm. for both the Ca10(OH)2(Po4)6 and MgSiO3 scalants. With the exception of the molecular weight study, equal weights of EDTA (ethylenediaminetetraacetic acid) were used to provide the standard against which the scalant dissolution potentials of the polyelectrolytes are compared. Test involved adding each of the test materials to one of two identical scalant solutions. Both solutions were agitated for two hours, (20 minutes for CaCo3 solutions), prior to filtration through a 0.45 micron filter. Residual Ca and Mg levels in the filtered solutions were measured by atomic absorption. Percent dissolution was calculated from the following formula.

Percent Dissolution Equals:

$$\frac{(\text{Test conc. PPM}) - (\text{Control conc. PPM})}{(\text{Total initial conc. PPM}) - (\text{Control conc. PPM})} \times 100$$

Tests were conducted in electronically controlled simulated cooling tower units. Tower capacity is 10 gallons with a 5 gallon per minute (GPM) recirculation rate. Bulk water temperature was maintained at 100°±2° F. with a T° of 4° F. Each test, including the initial control test, was conducted using makeup water. The recirculating water was initially increased to 3 cycles of concentration at a pH of 8.5 with acid feed. During the time required for the system to reach equilibrium, $CaCo_3$ scaling occurred on the stainless steel heating coil (skin temp. 145° F.) used as the primary scaling surface in the test units. Control levels of Ca and Mg were determined by acrylic acid on samples passed through a 0.45 micron filter. Once stabilized, 500 ppm. of active test material was slug fed into the system. An automated bleed/feed controller was used to maintain this level for the remainder of the test period. Water samples were analyzed on a daily basis for residual calcium levels in the same manner as the control samples. Plots of percent calcium dissolution versus time, showed the overall effect of the test material in this primarily $CaCo_3$ scaled unit.

Percent $CaCo_3$ dissolution was calculated from the following formula:

Percent Dissolution Equals:

$$\frac{\text{(Test conc. PPM)} - \text{(Control conc. PPM)}}{\text{(Total initial conc.)} - \text{(Control conc. PPM)}} \times 100$$

Various polyelectrolytes were evaluated in the laboratory. In addition to the $CaCo_3$, $Ca_{10}(OH)_2(Po_4)_6$ and $MgSiO_3$ scalants, iron oxide ($Fe_2O_3$) was initially included as one of the test scalants.

Figure 2:
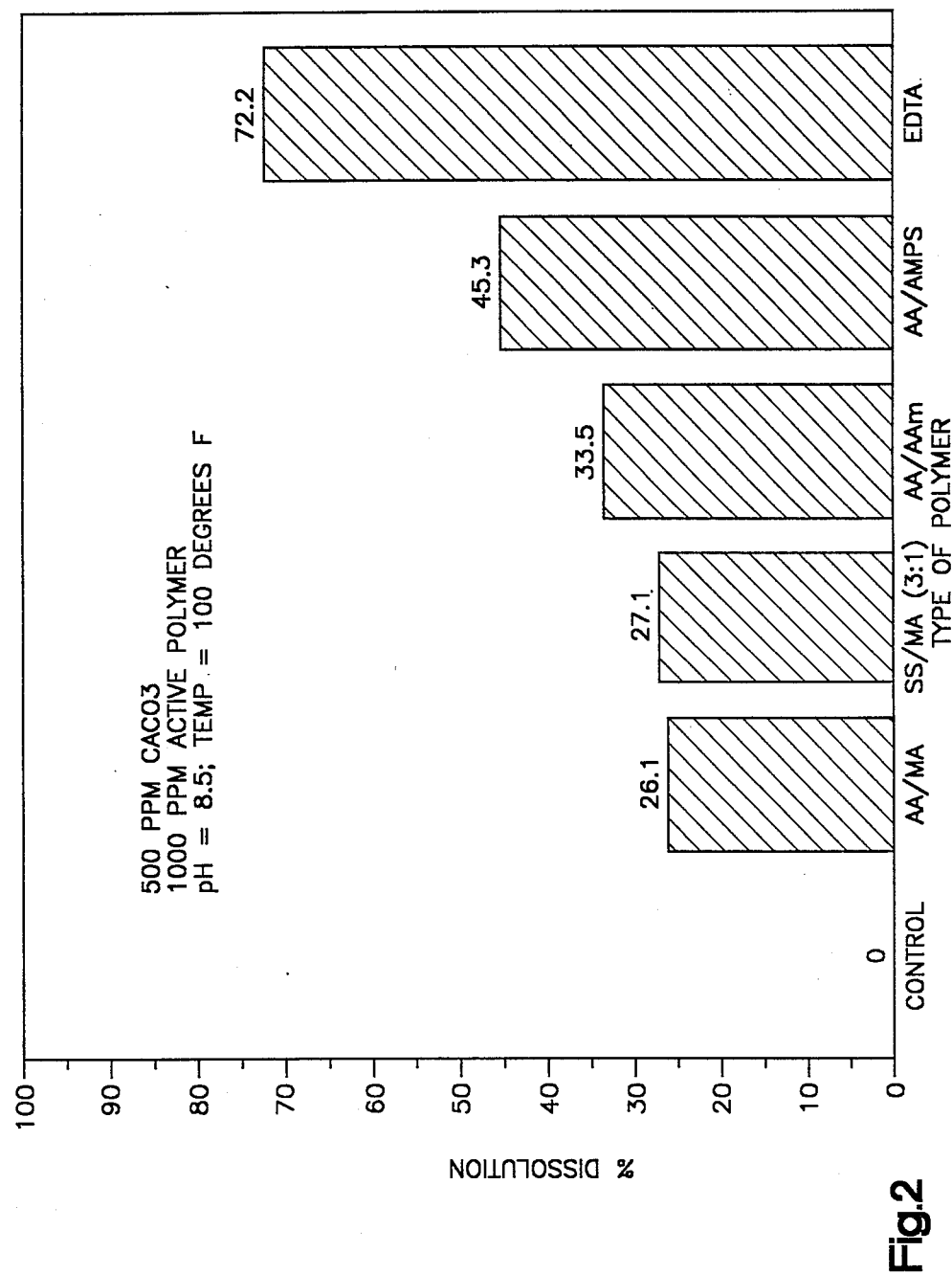
Figure 3:
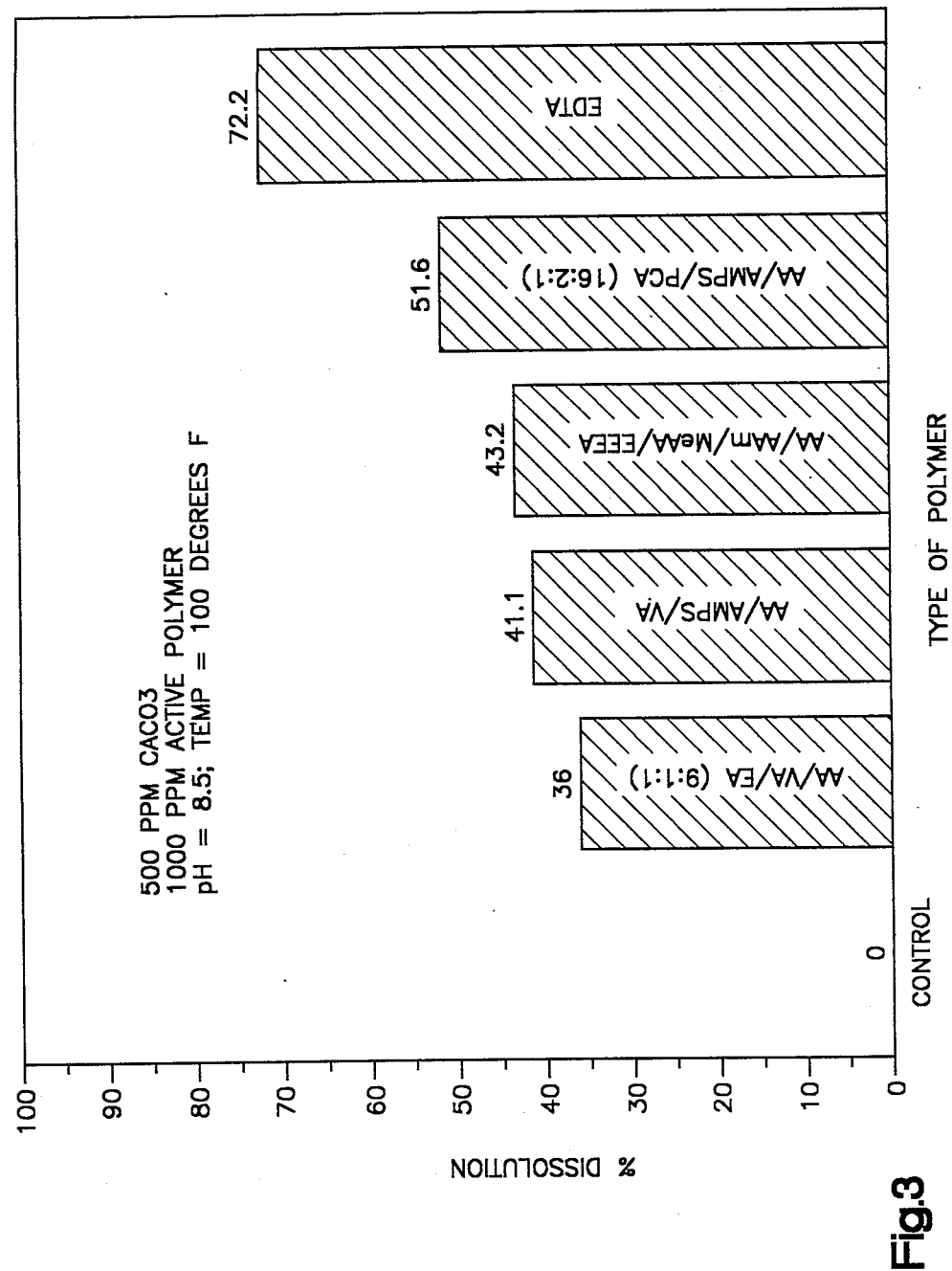

Results of the $CaCo_3$ dissolution tests as shown in FIGS. 1-3 show the polyelectrolytes to provide 17.1 (SS) to 57.1 (PCA) percent dissolution compared to 72.2% for the EDTA control. Both PCA and the AA/AMPS/PCA terpolymer were the most effective, showing over 50% dissolution of the $CaCo_3$ scalant, see FIG. 3. While both of these polymers contain the PCA monomer unit, its occurrence in the AA/AMPS/PCA terpolymer is at a 16:2:1 ratio, thereby limiting its overall effect on $CaCo_3$ dissolution relative to PCA. In fact, the AA/AMPS polymer minus PCA showed 45.3% $CaCo_3$ dissolution compared to the 51.6% level obtained with the PCA containing terpolymer. The molecular weights of all three of these polymers are between 3500 and 4500, thereby making this a reasonably accurate comparison.

Calcium Hydroxy Appetite ($Ca_{10}(OH)_2(Po_4)_6$)

Figure 4:
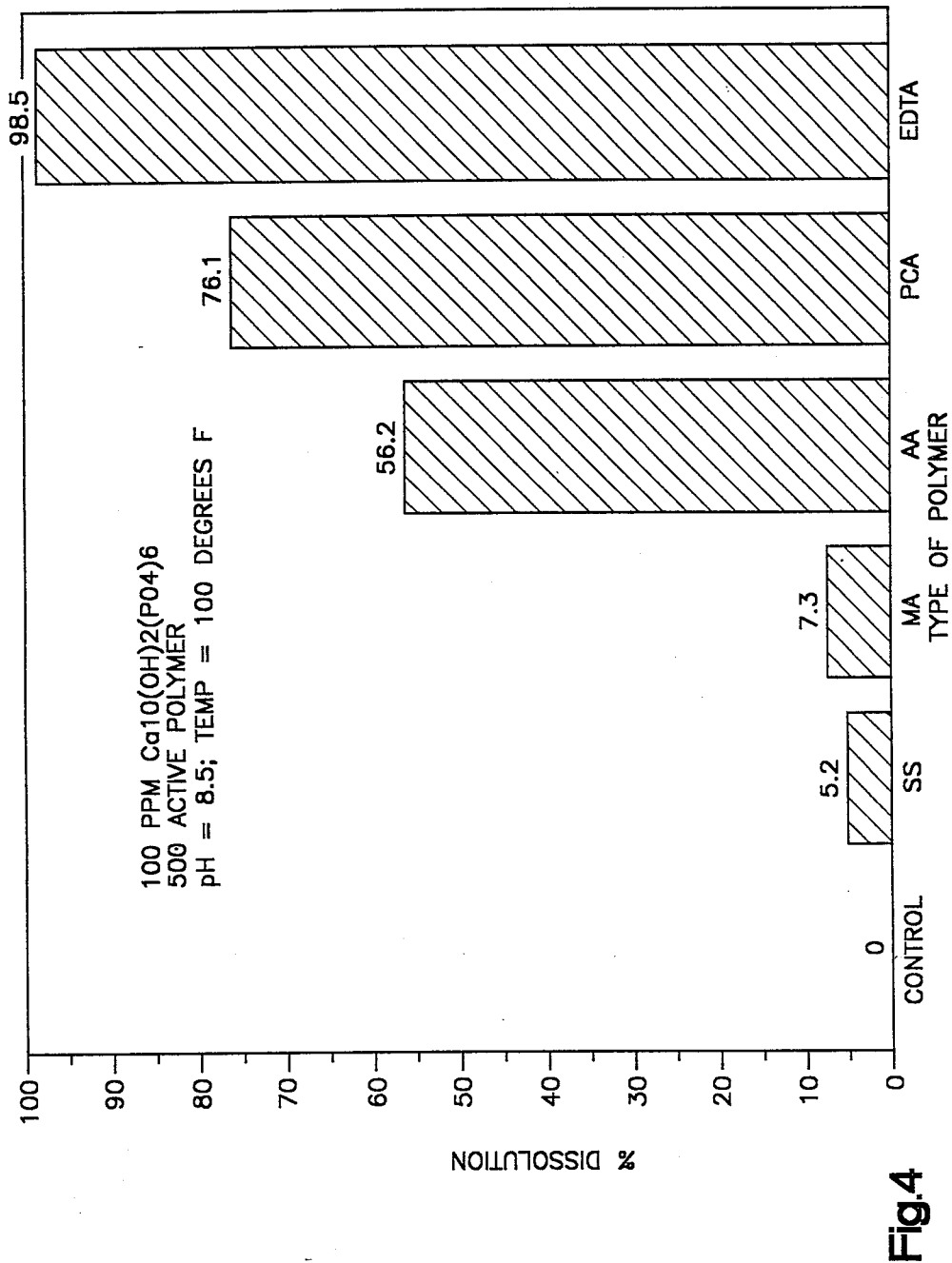
FIGS. 4, 5 and 6 are graphs showing the results of calcium phosphate dissolution tests comparing various compounds and polymers with phosphinocarboxylic acid in accordance with the present invention.
Figure 5:
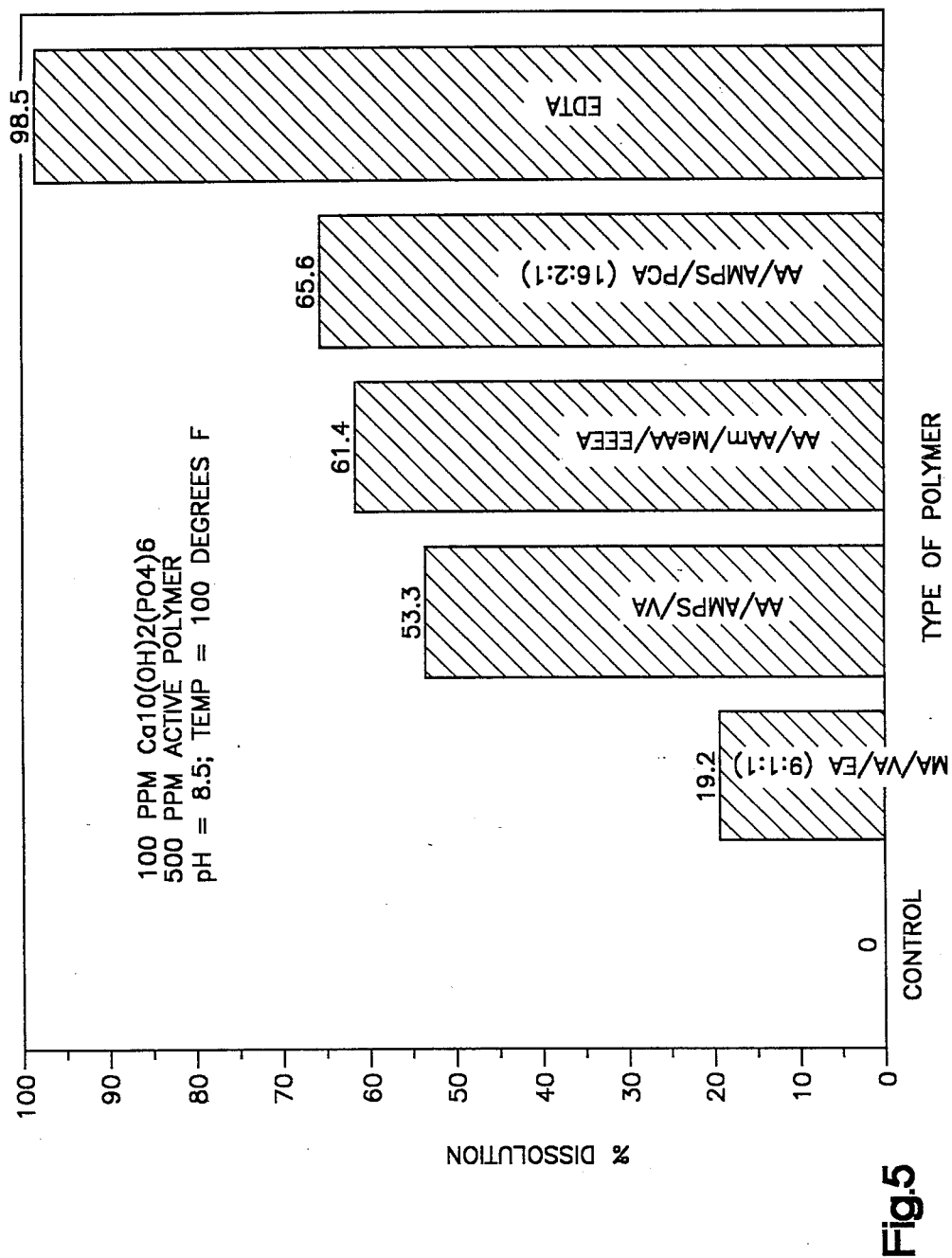
Figure 6:
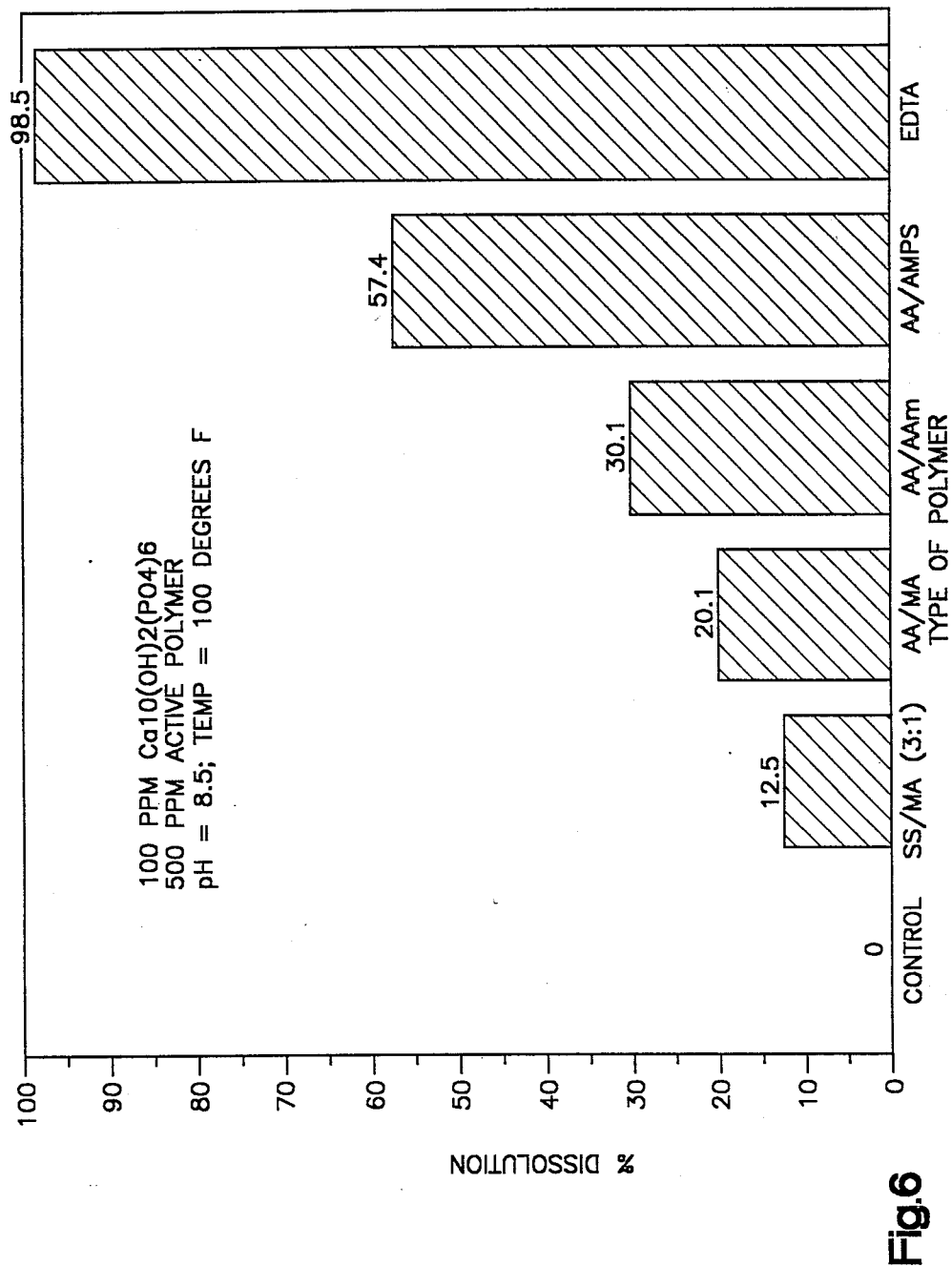

Results of the $Ca_{10}(OH)_2(Po_4)_6$ dissolution tests as shown in FIGS. 4-6 show the polyelectrolytes to provide from 5.2 to 76.1 percent dissolution compared to 98.5 percent for the EDTA control, see FIG. 4. The PCA homopolymer of this invention was the most effective at 76.1%. This was followed by the AA/AMPS/PCA terpolymer at 65.6% and the AA/AAM/MeAA/EEEA tetrapolymer at 61.4%, see FIG. 5. Dissolution percentages for polyacrylic acid alone or in conjunction with AMPS containing Co- and terpolymers were all in excess of 50%. The remaining polymers were all less than 30% effective against $Ca_{10}(OH)_2(Po_4)_6$. Except for the tetrapolymer, the relative order of effectiveness for the other polyelectrolytes was essentially the same for $Ca_{10}(OH)_2(Po_4)_6$ as that established for $CaCo_3$. The higher dissolution percentages found for $Ca_{10}(OH)_2(Po_4)_6$ were considered to be largely due to the 5 to 1 polymer to scale weight ratio compared to the 2 to 1 ratio in the $CaCo_3$ test.

Magnesium Silicate ($MgSiO_3$)

Figure 7:
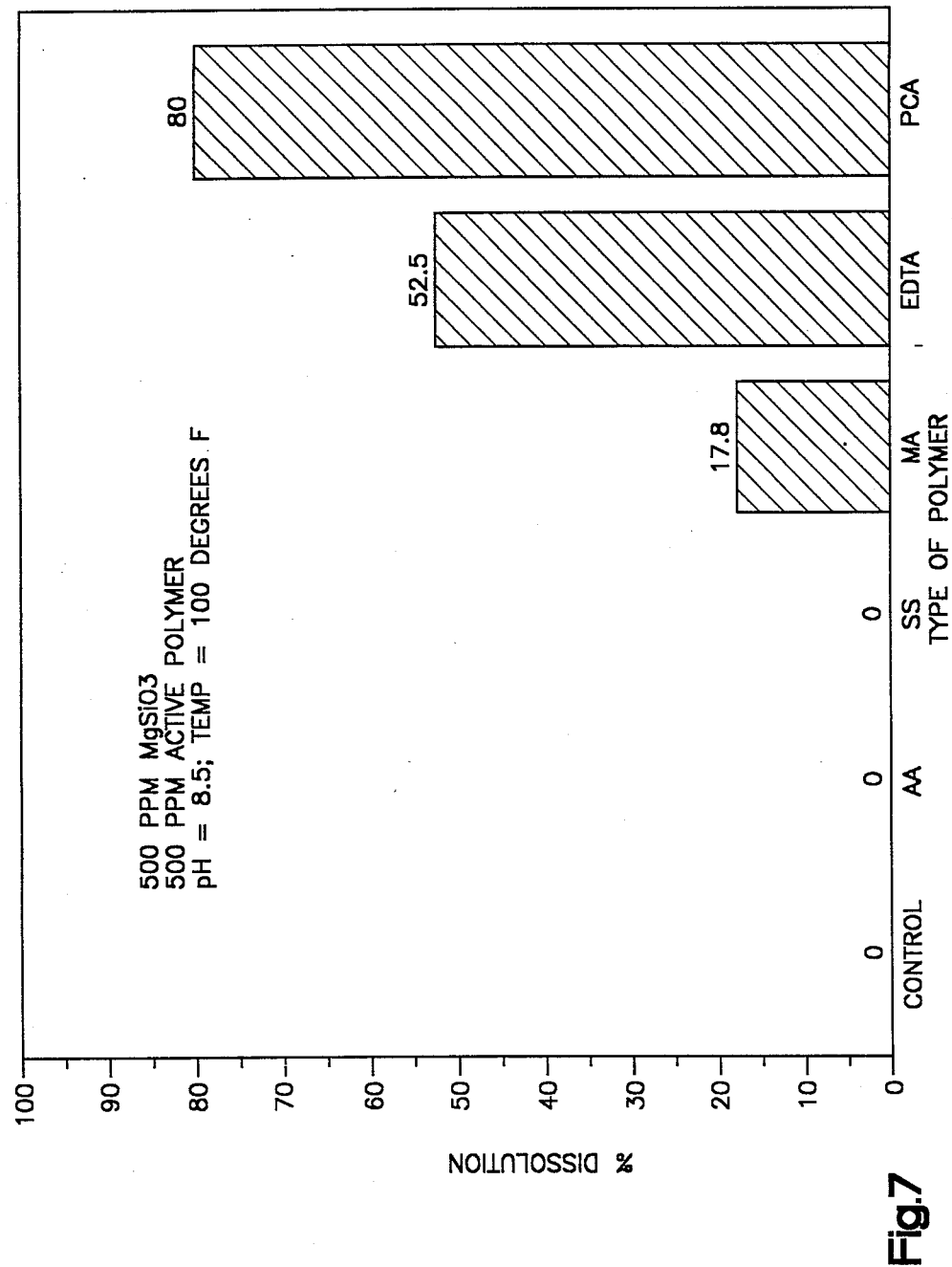
FIGS. 7, 8 and 9 are graphs showing the results of magnesium silicate dissolution tests comparing various compounds and polymers with phosphinocarboxylic acid in accordance with the present invention.
Figure 8:
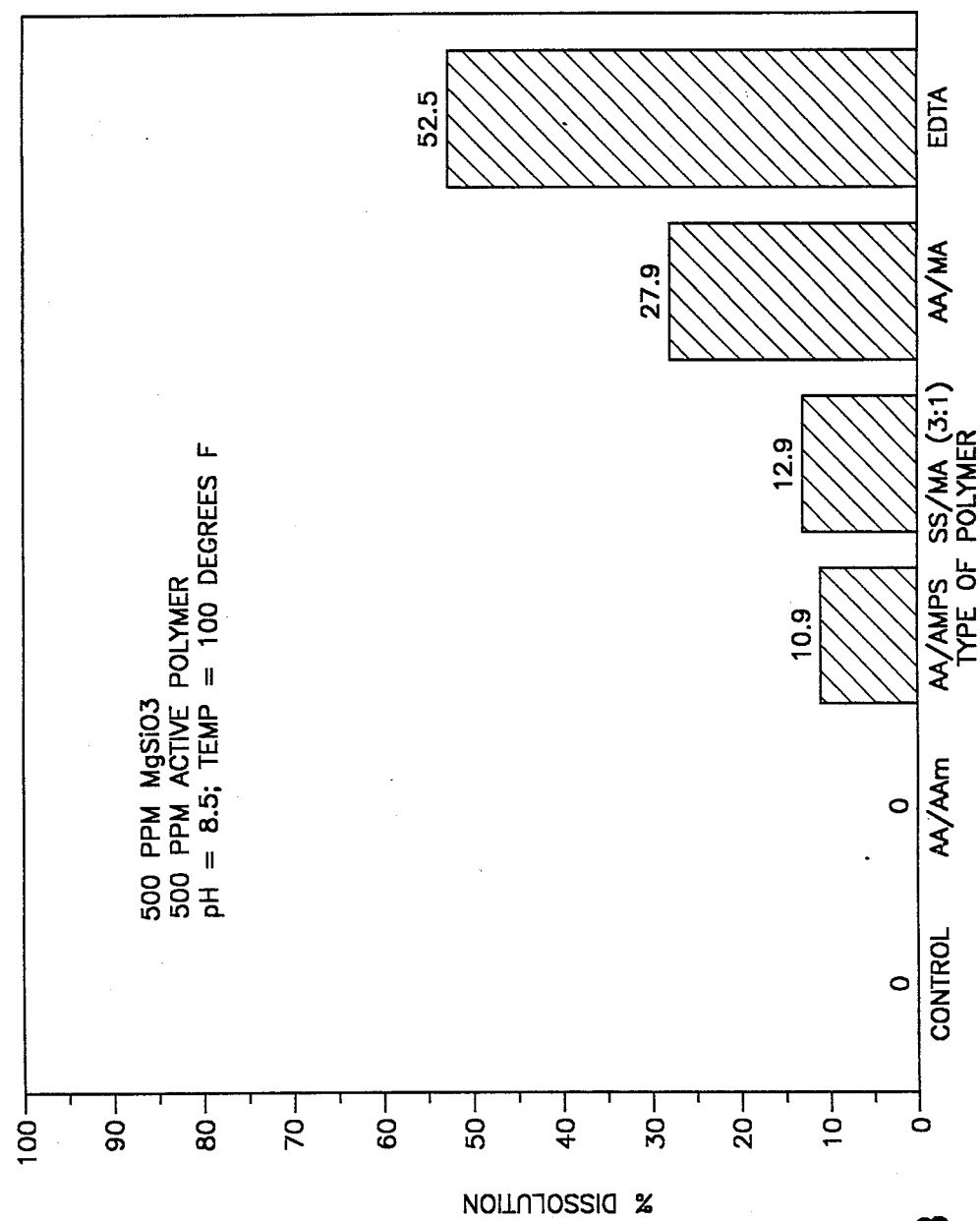
Figure 9:
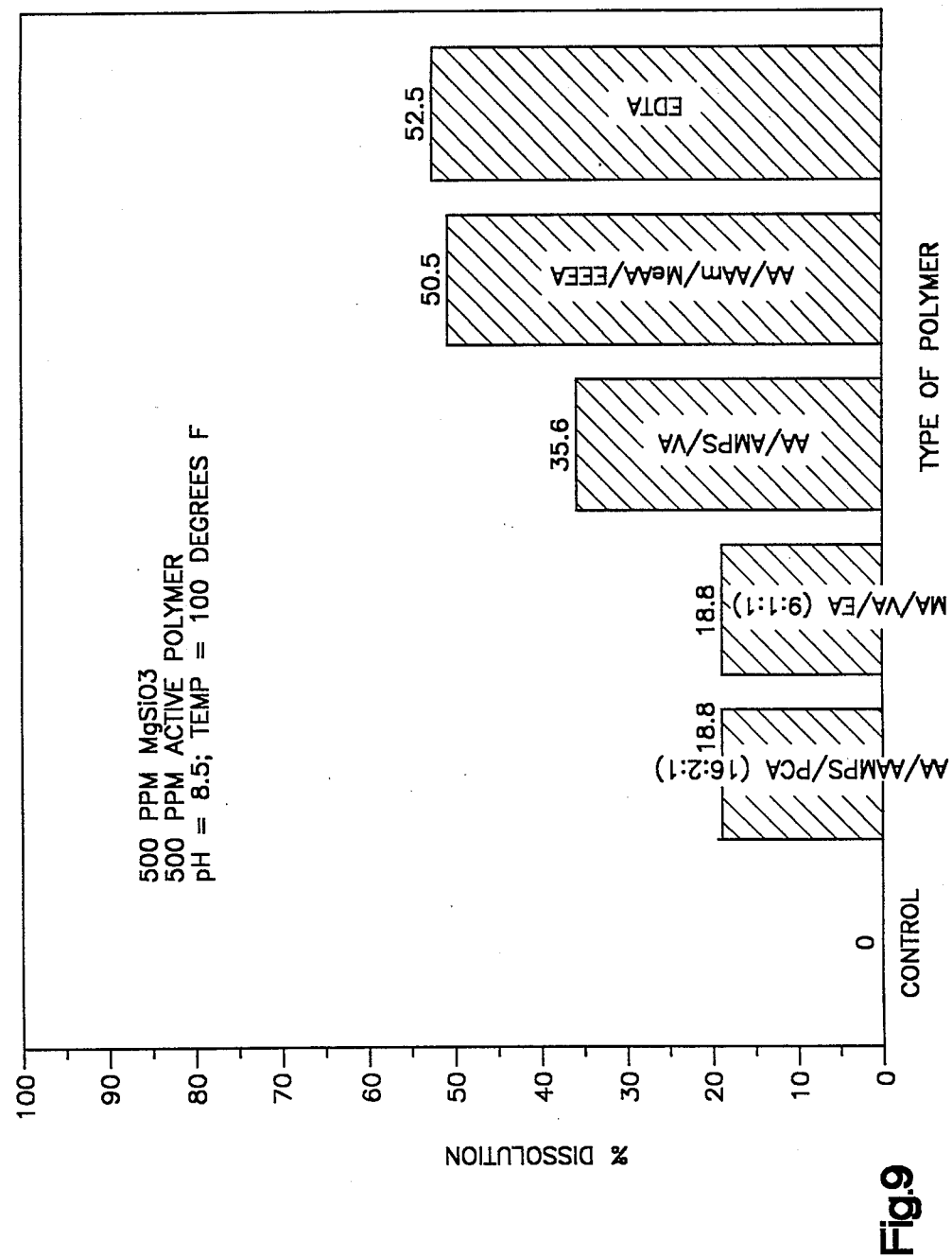

Results of the ($MgSiO_3$) dissolution tests as shown in FIGS. 7-9 show the polyelectrolytes to provide from 0.0 to 80 percent dissolution compared to 52.5 percent for EDTA. Once again, PCA of this invention proved to be the most effective of all the test polyelectrolytes showing 80 percent dissolution for $MgSiO_3$. This result is of particular significance since it is 27.5 percent in excess of the 52.5% control value for EDTA. In addition to its high level of effectiveness exhibited in the dissolution of both $CaCo_3$ and $Ca_{10}(OH)_2(Po_4)_6$, the PCA polymer is seen to possess maximum utility in applications involving $MgSiO_3$ scale removal. Except for the 50.5% dissolution shown for the tetrapolymer, all of the remaining polyelectrolytes were less than 35.6 percent effective. In fact, three polymers including two homopolymers AA, SS, and one copolymer (AA/AAn) show zero percent dissolution for $MgSiO_3$.

Pilot Cooling Tower Tests

The primary purpose of the pilot cooling tower tests was to assess the value of the earlier screening test results in achieving alkaline on-line $CaCo_3$ scale removal. The results of these pilot tests show essentially the same 67 percent drop in hardness retention over the first four days at three cycles of concentration. In each test, $CaCo_3$ scale was visible on all of the heating coil surfaces. Upon the addition of either EDTA or one of two test polymers after 96 hours into the test, significant increases in soluble hardness levels occurred over the remaining three days of each test. Only the control test showed no change, remaining at the 33 percent hardness retention level. Both PCA and AA showed a reasonably linear increase in hardness with time, whereas EDTA shows a significantly lower rate of increasing hardness after the first 24 hours. In terms of percent scale dissolution, PCA effectively dissolved 43 percent of the $CaCo_3$ scale compared to 39 percent for the AA polymer. These $CaCo_3$ dissolution levels are considerably below those found in the screening tests, with PCA showing a greater reduction from the difference in water type than AA. EDTA, on the other hand, failed to provide the highest level of $CaCo_3$ scale dissolution that was achieved in the screening tests. In fact, only 20 percent dissolution of the $CaCo_3$ scale was obtained in the pilot cooling tower test.

As illustrated by the data shown in Table II and FIGS. 1-9, the use of the phosphinocarboxylic acids in accordance with this invention was substantially better in comparison to other compounds and/or polymers for the removal of calcium carbonate as shown in FIGS. 1-3 and calcium phosphate as shown in FIGS. 4-6. More important, the use of the phosphinocarboxylic acids of this invention showed a substantial improvement when compared with methacrylic acid and ethylenediaminetetraacetic acid, for example, with respect to magnesium silicate as shown in FIGS. 7-9. Thus, by utilizing substantially larger amounts of the phosphinocarboxylic acid or its salt, dissolves the buildup of silicate scale and particularly magnesium silicate scale can be removed on a continuous process. The amount of the phosphinocarboxylic acid added to the aqueous systems in accordance with this invention is comparatively larger than the amount used with same acids or its salts in an aqueous system to prevent the accumulation.

Therefore, it is obvious that the removal as distinguished from preventing the accumulation of scale e.g. magnesium silicates is substantially a different problem requiring a different solution as indicated by the data presented in Table II and FIGS. 1–9.

In addition, to the use of a water-soluble phosphinocarboxylic acid or its salt, other water treating additives may be employed in combination therewith to help remove the sludge forming materials from the system. For example, the treatment of aqueous systems may comprise a combination of the phosphinocarboxylic acids of this invention with one or more other additives in amounts ranging from about 0.001 to about 10,000 parts by weight including the dispersing and/or threshold agents such as polymerised acrylic acid (or its salts), hydrolysed polyacrylonitrile, polymerised methacrylic acid and its salts, polyacrylamide and copolymers thereof from acrylic and methacrylic acids, lignin sulphonic acid and its salts, tannin, naphthalene sulphonic acid/formaldehyde condensationproducts, starch and its derivatives, cellulose, acrylic acid/lower alkyl hydroxyacrylate copolymers sulphonated styrene/maleic anhydride copolymers, styrene/maleic anhydride copolymers and sulphonated styrene homopolymers and combinations thereof. Specific threshold agents include 2-phosphonobutane-1,2,4-tricarboxylic acid, acetodiphosphonic acid, hydrolysed polymaleic anhydride and its salts, alkyl phosphonic acids, 1-aminoalkyl-1, 1-diphosphonic acids and their salts, and the alkali metal polyphosphates, etc.

Precipitating agents include alkali metal orthophosphates and carbonates. Oxygen scavengers include alkali metal sulphites, the sequestering agents include the nitrilotriacetic acid and its salts. The antiforaming agents include the silicones e.g. polydimethylsiloxanes, distearylsebacamide, distearyl adipamide and related products derived from ethylene oxide and/or propylene oxide condensations, in addition to fatty alcohols, such as capryl alcohols and their ethylene oxide condensates. The biocides include the amines, quaternary ammonium compounds, chlorophenols, sulphur-containing compounds such as sulphones, methylene bis thiocyanates and carbamates, isothiazolones, brominated propionamides, triazines, phosphonium compounds, chlorine and chlorine-release agents and organometallic compounds such as tributyl tin oxide, etc. Corrosion inhibitors include the triazoles such as benzatriazoles, etc.

More important, for the purposes of this invention, the phosphinocarboxylic acids are preferably used in combination with one or more anionic and nonionic compounds and/or polymers as dispersants in amounts of 0.01 to 10,000 or 0.01 to 1000 parts by weight per million parts of water to remove the silicate salt scale and sludge from the system. The polyanionic polymers are used in the process of this invention in amounts preferably ranging from 0.01 to 1000 parts by weight. These polymers contain at least about 50 mole percent of repeating units and are derived from an ethylenically unsaturated diabasic acid and/or an ethylenically unsaturated sulfonic acid. Ethylenically unsaturated diabasic acids are those that undergo free radical polymerization and include maleic and fumaric acids. The unsaturated sulfonic acids also undergo free radical polymerization and include allylsulfonic acid. Preferred materials include homopolymers of maleic acid and fumaric acid and copolymers of allylsulfonic acid. The acid units of the polyanionic polymer may be in the free acid form, ammonium salt, or alkali metal salt. The polyanionic polymers have molecular weights in the range of about 500 to about 50,000.

The nonionic materials used in preferable amounts ranging from about 0.01 to 1000 parts by weight include the hydroxy-containing, linear polymers of lower alkylene oxide, such as ethylene and propylene oxides, and generally characterized as higher linear lower alkanols which are normally liquid at room temperature. These include condensation products of higher fatty alcohols with poly-lower alkylene glycols, such as Neodol 45-11, Plurafac B-26 and Alfonic 1618-65. Also useful are the block copolymers of propylene glycol, propylene oxide and ethylene oxide, such as the Pluronics, e.g., Pluronic L-44, and the middle alkyl phenyl polyoxyethylene ethanols, such as Igepals, etc.

While this invention has been described with respect to a number of specific embodiments, it is obvious that there are other variations and modifications which can be made without departing from the invention as set forth in the appending claims.

The invention claimed is:

1. A process for dissolving and removing silicate scale comprising magnesium silicate from aqueous systems which comprises adding to the water in said systems from about 500 to 2000 parts by weight per million parts by weight of water of a water-soluble phosphinocarboxylic acid having the formula

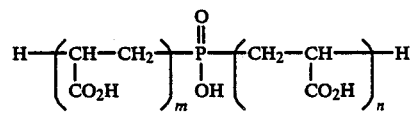

wherein the sum of m plus n is an integer having a value ranging from about 3 to 100, wherein the phosphinocarboxylic acid has an average molecular weight ranging from about 300 to 12,000.

2. The process of claim 1 wherein the phosphinocarboxylic acid is an alkali metal salt.

3. The process of claim 1 wherein the phosphinocarboxylic acid is an alkaline earth metal salt.

4. The process of claim 1 wherein an effective amount of at least one dispersant selected from the group consisting of water-soluble nonionic and anionic dispersants is added to the water system.

5. The process of claim 4 wherein at least one nonionic and one anionic dispersant is added to the water in an amount of 0.01 to about 10,000 parts by weight of each dispersant per million parts by weight of the water.

6. The process of claim 5 wherein the phosphinocarboxylic acid is added to the water in the amount of about 800 to 1500 parts by weight and the anionic dispersant is derived from an ethylenically unsaturated dibasic acid and the nonionic dispersant is derived from a lower alkylene oxide.

7. The process of claim 4 wherein at least one nonionic or one anionic dispersant is added to the water in the system in an amount ranging from about 0.01 to 1000 parts by weight per million parts by weight of the water.

8. The process of claim 1 wherein the phosphinocarboxylic acid is added to the water in an amount ranging from about 500 to 2000 parts by weight per million parts by weight of the water.

9. The process of claim 1 wherein the aqueous system is a desalination system.

10. The process of claim 1 wherein the aqueous system is a boiler water or heat exchange system.

* * * * *